March 24, 1964  R. DUDAS  3,126,088
ERROR DETECTOR AND ACTUATOR
Filed Feb. 18, 1963  2 Sheets-Sheet 1
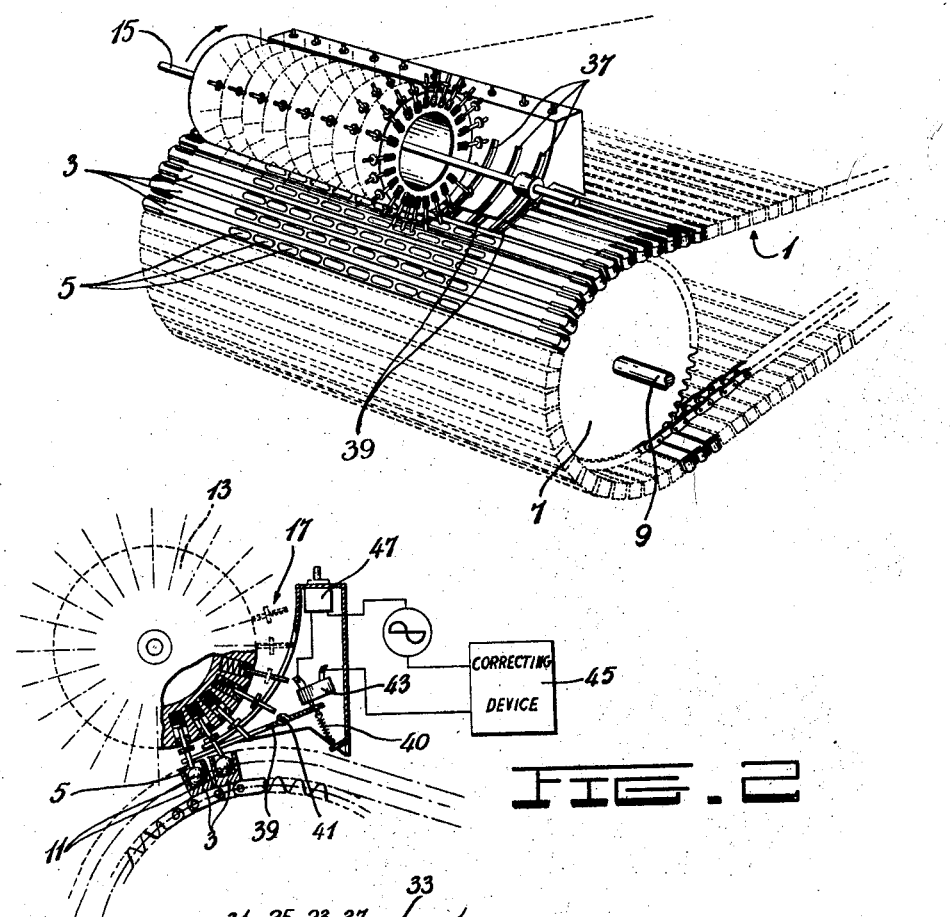
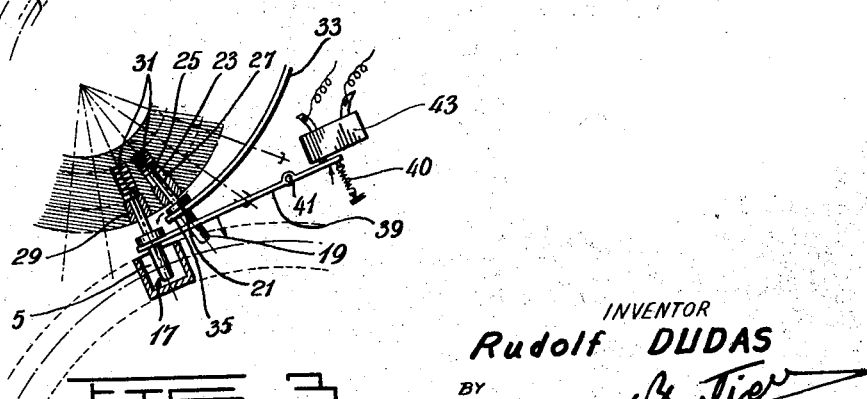
INVENTOR
Rudolf DUDAS
BY
ATTORNEYS March 24, 1964

R. DUDAS 3,126,088

ERROR DETECTOR AND ACTUATOR

Filed Feb. 18, 1963

INVENTOR.
Rudolf DUDAS
BY

ATTORNEYS

United States Patent Office 3,126,088
Patented Mar. 24, 1964

3,126,088
ERROR DETECTOR AND ACTUATOR
Rudolf Dudas, 65 58th Ave., Laval des Rapides,
Quebec, Canada
Filed Feb. 18, 1963, Ser. No. 259,259
6 Claims. (Cl. 198—40)

The present invention is intended for use in connection with feeding and other proportionating or dispensing machines, particularly in such machines where the material handled is made up of small solid masses of uniform size and shape. Examples of such solid masses are tablets, pills, capsules. More particularly the invention is intended for machines of the type defined above and where the material is dispensed in consecutive and equal incremental batches of the small solid masses.

The invention is primarily concerned with the detection of all errors in the number of articles in each incremental bath before such batch is dispensed and in causing a rejection mechanism to be actuated in order to prevent dispensing and/or count recording of the same.

The invention is very well adapted for use in counting machines where, instead of counting individual articles, the desired count is obtained by counting consecutive and numerically equal lots of the articles; the function of the invention being the detection of all faulty lots prior to their being released by the machine, every detected faulty lot being, as a result, either rejected or not released depending on the machine itself.

In the pharmaceutical and other industries, capsules or similar articles simple in shape and of relatively small sizes are often packaged in bottles or the like, each containing a specific number of the articles. It is therefore imperative to ensure that the exact predetermined number of capsules or the like articles go into each container, particularly if packaging is done at such a high rate of operation as to forbid visual detection of errors.

The counting and feeding of capsules is normally done in multiples, such as of 10, and the packaging device is adapted to make sure that the right number of multiples go into each container. For this purpose, the capsules may be disposed on an endless conveyor having a plurality of cavities each of which is adapted to receive one such tablet. These cavities are disposed in a succession of rows, disposed transversely in relation to the direction of travel of the conveyor. The rows all contain an equal number of cavities, also arranged in longitudinal alignment; the number of cavities in each row being equal to the aforementioned multiple. The packaging device is provided with a mechanism for allowing a certain number of rows to be discharged into the container. Counting of the number of multiples or rows is also automatically effected so that a constant account of the number of the capsules or the like is kept.

Since, in such machines, only the number of rows, or multiples, rather than the number of the articles themselves, is counted, it is imperative to ensure that each row of cavities contain a number of tablets equal to the number of cavities.

It is therefore a main object of the invention to provide an error detecting device capable of spotting an empty cavity in any of the rows of cavities prior to its discharge, and to cause an actuator to operate for either correcting the said error on the spot and/or accounting for such an omission in the counting machine.

Another object of the invention lies in the provision of an error detector of simple design, yet quite accurate in operation, composed of a small number of elementary parts, the device having a low manufacturing cost and an equally low maintenance cost.

The above objects may be achieved with an error detector and an actuator made according to the teachings of the invention, the basic idea of which is to have a sensing element mounted on a supporting body rotatable at a peripheral speed substantially equal to the displacement speed of the endless conveyor carrying the capsules or other articles, the sensing element moving over and being applied on the article in the cavities as the latter move by the rotating error detector. If a cavity should happen to be empty, the sensing element corresponding to that cavity will be forced further away from the supporting body and made available to hit an actuator, the movement of which can thereafter serve to cause operation of a correcting device.

A better idea of the invention will be had by the description that follows of a preferred embodiment thereof having regard to the annexed drawings wherein:

FIGURE 1 is a perspective view of an error detector made according to the invention;

FIGURE 2 is an elevation view of the error detector of the invention, partly shown in cross-section to illustrate the inner structure thereof;

FIGURE 3 is a cross-sectional view, on an enlarged scale, similar to that of FIGURE 2, but showing the error detector as an empty cavity is being sensed.

Figure 5:
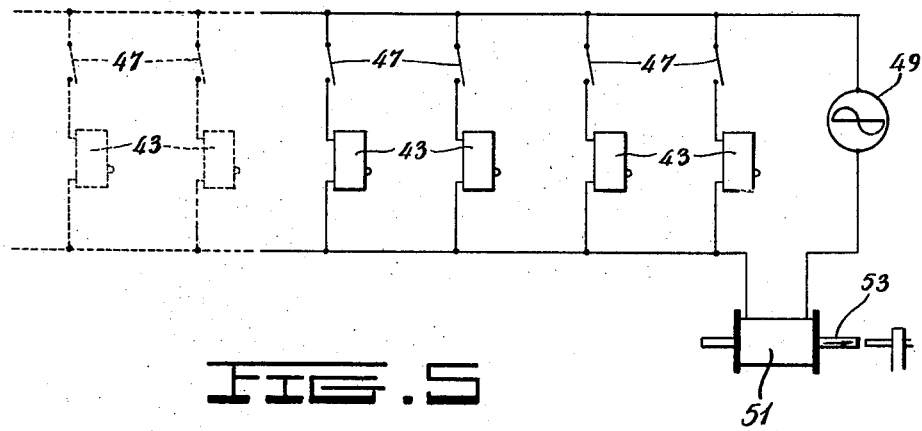
FIGURE 5 is an electrical diagram of the secondary circuit for correcting the error sensed by the detector.

FIGURE 1 illustrates an endless conveyor for capsules or similar small articles of relatively small size, comprising a series of interconnected transverse elongated rods 3, each containing a number of cavities 5 into each of which is received an article such as a pill, a capsule or other similar article. The endless conveyor winds around a drum 7 mounted for rotation on shaft 9.

The detector itself comprises a rotating body 13 mounted for rotation on an axle 15 and provided with circumferentially disposed rows of radial sensing elements which are generally denoted by numeral 17. The spacing of the sensing elements 17 across body 13 is the same as the spacing of a cavities 5 longitudinally of bars or rods 3. Similarly, the circumferential spacing of the sensing elements, at the outer end thereof, is as nearly equal to the spacing between successive rows of cavities 5 as possible. Thus, if the angular velocity of body 13 is such that the peripheral velocity of the tip of the sensing elements 17 is the same as the linear velocity of conveyor 1, there will always be a sensing element 17 over a cavity 5 as the conveyor 1 moves past the error detector.

As best seen in FIGURE 3, each sensing element 17 is composed of a sensing tip 19 at the radial inner end of which is an abutment member 21 followed by a guiding rod 23 terminating at the extreme inner end with a flange 25. The rearward end of a sensing element 17, formed by guiding rod 23 and flange 25, is displaceable in a radial passage or bore 27 of body 13. In order to prevent this rearward end from escaping from its passage or bore 27, the latter is closed by a guiding ring 29 through the central opening of which slides the guiding rod 23. It will therefore be seen that the sensing element may be displaced from what will be termed a radial inner position, which is the rightward position in FIGURE 3, to a radial outward position, which is the leftward position of FIGURE 3. The first position is also called the inoperative position while the second position is called the operative position.

It will be noted that a spring 31 forces the sensing element into the outward operative position.

In cooperation with the sensing elements 17 is an abutment means composed of a bearing plate 33, preferably arcuate, extending gradually closer to the body to form an end portion 35 adapted to stand close to the periphery of body 13.

As best illustrated in FIGURE 1, bearing plate 33 is provided with a set of spaced slots 37 opening at the extremity of end portion 35 and having parallel lateral abutment edges extending in planes normal to the axis of rotation of body 13. Slots 37 are of such a width and so disposed that as body 13 rotates, sensing tips 19 project across the slots while abutting members 21 overlie the lateral edges of the slots and eventually slidably ride thereon as illustrated by the rightward sensing element of FIGURE 3.

As aforesaid, the side edges of slots 37 are so positioned as to abuttingly receive the abutment members 21 as said body 13 rotates and the spacing of end portion 35 of bearing plate 33 from body 13 is also such as to force sensing tips 19 towards inoperative position against resilient means 31 as said body rotates. As each of the abutment members passes beyond the extremity of the end portion 35 it is released therefrom, and pressed into operative position by springs 31. This is the leftward position of sensing element 17 of FIGURE 3. However, should all cavities in a row contain an article, the respective sensing tip 19 will rest against it and be retained in the inoperative position for as long as abutment members lie facing an actuator 39, as illustrated in FIGURE 2.

For each longitudinal row of cavities 5 and for each slot 37, there is provided an actuator 39 mounted below bearing plate 33 but extending past end portion 35. Each actuator 39 is formed as a fork, the legs of which are adapted to straddle the bearing tips 19 but be engaged by the abutment members 21, as clearly shown in FIGURE 3. Actuators 39 pivot around a pivot axis 41 and the end away from the forked end is adapted to come in contact with a microswitch 43 which may be part of a correcting circuit. Normally, the forked end is kept in contact with plate 33 by means of spring 40.

As will readily be understood from the above description, when body 13 rotates, the sensing elements rotate therewith and at each revolution ride in slots 37 with the abutment members 21 thereof eventually sliding over the lateral edges of the slots as they reach end portion 35, at which time the sensing elements are driven inward toward operative position. As they move past the extremity of the end portion and if all cavities contain a tablet, as in FIGURE 2, the sensing elements will be forced to operative position by spring 31 only after they have passed actuator 39 and will therefore not act thereon. However, if one cavity is empty, then nothing will prevent the corresponding sensing element from reaching the operative position in which case it will force pivoting of actuator 39, causing contact with microswitch 43 and closure thereof. Closure of this microswitch will, in turn, cause actuation of a correcting device 45 which will either correct the counting meter or cause discarding of the incomplete row of cavities or both. Should it be desired to reduce the number of cavities in one row, or reduce the working multiple, it is only necessary to depress the hand switch 47 corresponding to one or more microswitches 43. In such an instance, the corresponding correcting circuit or circuits will always be open and even if the sensing elements react to the empty cavities, there will not be any reaction in the correcting circuits.

Figure 4:
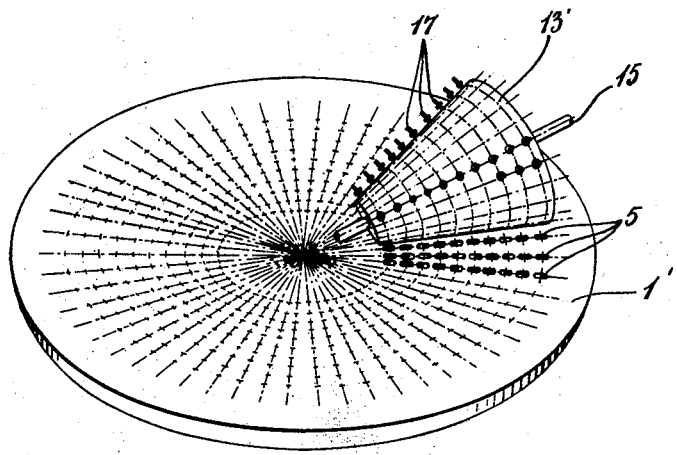
FIGURE 4 is another embodiment of the invention.

In FIGURE 4, is shown a second embodiment of the invention, wherein the endless conveyor is a flat disk 1' provided with the usual cavities 5 and the detector is formed with a frusto-conical body 13' having the usual sensing elements 17 as described in conjunction with FIGURES 1, 2 and 3.

FIGURE 5 is intended to illustrate an elementary correcting circuit. It will be seen that all microswitches and hand switches corresponding to various longitudinal rows of conveyor 1 are mounted in parallel branches across a power source 49 and in series with an electromagnet 51. Whenever a microswitch 43 is closed the electromagnet 51 becomes energized and an actuating rod 53 is forced out of the electromagnet 51 as indicated by the arrow in FIGURE 5. This rod 53 may be used to cause actuation of a discarding device for automatically emptying the faulty row of pills or the like. It may also actuate a memory wheel for counting the number of discarded rows.

Although specific embodiments of the invention have been described, it will be understood that the invention is not to be limited thereby and that various modifications may be made thereto without departing from the spirit of the said invention.

I claim:
1. An error detector comprising:
   (a) a body rotatable about a central axis;
   (b) at least one sensing element projecting radially away from the periphery of said body;
   (c) means allowing said sensing element to move from a radially inward inoperative position to a radially outward operative position;
   (d) an abutment member on said sensing element, at the radial inner end thereof;
   (e) resilient means forcing said sensing element into said operative position;
   (f) abutment means, separate from and fixed in relation to said body and of limited extent, cooperable with said abutment member to drive said sensing element toward inoperative position against said resilient means and suddenly release said element when the latter has rotated past said abutment means.

2. An error detector comprising:
   (a) a body, rotatable about a central axis;
   (b) at least one sensing element projecting radially away from the periphery of said body;
   (c) means allowing said sensing element to move from a radially inward inoperative position to a radially outward operative position;
   (d) an abutment member on said sensing element, at the radial inner end thereof;
   (e) resilient means forcing said sensing element into said operative position;
   (f) abutment means, adjacent said body and fixed in relation thereto, adapted to receive said abutment member and so spaced in relation to said body as to force said sensing element toward inoperative position;
   (g) said abutment means having a limited extent in relation to said body whereby as said abutment member reaches past the abutment means and becomes free therefrom, it is driven toward said operative position by said resilient means.

3. An error detector and an actuator comprising:
   (a) a body, rotatable about a central axis;
   (b) at least one sensing element having a sensing tip projecting radially away from the periphery of said body;
   (c) means allowing said sensing element to move from a radially inward inoperative position to a radially outward operative position;
   (d) an abutment member on said element at the radial inner end of said tip;
   (e) resilient means forcing said tip radially away from the periphery of said body and into said operative position;
   (f) a bearing plate adjacent said body and extending gradually closer thereto to form an end portion standing at a predetermined radial distance from said body and having at least one abutting edge extending in a plane normal to said central axis;
   (g) said abutting edge being in such a position as to abuttingly receive said abutment member as said body rotates and said predetermined distance being such as to force said sensing tip toward inoperative position against said resilient means as said body rotates, whereby as said abutment member reaches past the extremity of said end portion and becomes free therefrom, it is pushed into operative position;

(h) an actuator located past the extremity of said end portion, radially outwardly therefrom and in a position to be hit by said abutment member as said sensing tip is pushed to operative position.

4. An error detector and an actuator comprising:
(a) a body rotatable about a central axis;
(b) said body having at least one radial passage opening at the periphery thereof;
(c) a sensing element, in said passage, having a sensing tip projecting out of the passage;
(d) means, in said passage and on said element, allowing displacement of the sensing tip from a radially inward inoperative position to a radially outward operative position;
(e) an abutment member, on said element, at the radial inner end of said tip;
(f) resilient means forcing said tip into said operative position;
(g) a bearing plate circumscribing part of said body and bending gradually closer thereto in the direction of rotation of said body to form an end portion standing at a predetermined radial distance from said body and having at least one abutting edge extending in a plane normal to said axis;
(h) resilient means forcing said sensing element into said operative position;
(i) abutment means, adjacent said body and fixed in relation thereto, adapted to receive said abutment member and so spaced in relation to said body as to force said sensing element toward inoperative position;
(j) said abutment means having a limited extent in relation to said body whereby as said abutment member reaches past the abutment means and becomes free therefrom, it is driven toward said operative position by said resilient means.
(k) an actuator located past the extremity of said end portion, radially outwardly therefrom and in a position to be hit by said abutment member as said sensing tip is pushed to operative position.

5. An error detector and an actuator comprising:
(a) a body rotatable about a central axis;
(b) an arcuate bearing plate circumscribing part of said body and gradually curving closer thereto to terminate into an end portion substantially tangent to and spaced from said body;
(c) said plate being formed with a series of spaced parallel slots defining side edges extending in planes normal to said central axis; said slots opening at the extremity of said end portion;
(d) said body having a plurality of passages projecting radially in relation to the central axis and opening at the periphery of said body; said passages being distributed in axial longitudinal rows around said body; the number of passages of one row being equal to the number of slots and each opening in front of a slot when facing said plate in the course of rotation of said body;
(e) a sensing element, for each passage, having a sensing tip projecting out of the passage;
(f) means, in said passages and on said elements, allowing displacement of the sensing tips from a radially inward inoperative position to a radially outward operative position and vice versa;
(g) an abutment member, on each sensing element, at the inner end of the sensing tip;
(h) resilient means forcing said tips into said operative position;
(i) the side edges of said slots being in such a position as to abuttingly receive said abutment members as said body rotates and the spacing of said end portion of said bearing plate from said body being such as to force said sensing tips toward inoperative position against said resilient means as said body rotates, whereby as said abutment member reaches past the extremity of said end portion and becomes free therefrom, it is pushed into operative position;
(j) an actuator located past the end opening of each slot, radially outwardly therefrom and in a position to be hit by the corresponding abutment member as the corresponding tip is pushed to operative position.

6. A detector and an actuator as claimed in claim 5, wherein said means allowing displacement of said tips from inoperative to operative positions and vice versa comprises a guiding rod, inwardly of the sensing tip, terminated at the inner end by a lateral flange; a ring, fixed at the outer end of the passage and through which said rod extends; said flange having an outer dimension greater than that of the central hole in the ring whereby the inner and outer extreme positions of said sensing tip are determined by said abutment member and flange, respectively.

References Cited in the file of this patent
UNITED STATES PATENTS
2,827,151    Engleson _____ Mar. 18, 1958